United States Patent [19]
Stevens

[11] Patent Number: 5,454,959
[45] Date of Patent: Oct. 3, 1995

[54] MOVING BED FILTERS

[76] Inventor: Jay S. Stevens, 206A S. Loop 336 West, Box 103, Conroe, Tex. 77301

[21] Appl. No.: 349,382

[22] Filed: Dec. 5, 1994

Related U.S. Application Data

[63] Continuation of Ser. No. 145,254, Oct. 29, 1993, abandoned.

[51] Int. Cl.$^6$ .................................................. B01D 24/14
[52] U.S. Cl. .......................... 210/792; 210/793; 210/807; 210/189; 210/268; 210/269
[58] Field of Search ................... 210/268, 269, 210/274, 275, 792, 791, 793, 675, 676, 189

[56] References Cited

U.S. PATENT DOCUMENTS

| | | | |
|---|---|---|---|
| 1,608,661 | 11/1926 | Nordell | 210/189 |
| 1,861,295 | 5/1932 | Bramwell | 210/189 |
| 2,057,887 | 10/1936 | Elliott et al. | 210/268 |
| 3,550,774 | 12/1970 | Hirs | 210/189 |
| 3,598,235 | 8/1971 | Demeter | 210/275 |
| 3,667,604 | 6/1972 | Lagoutte | 210/136 |
| 3,767,048 | 10/1973 | Prengemann | 210/268 |
| 3,953,333 | 4/1976 | Hirs | 210/290 |
| 4,005,016 | 1/1977 | Haese et al. | 210/268 |
| 4,060,484 | 11/1977 | Austin et al. | 210/279 |
| 4,126,546 | 11/1978 | Hjelmner et al. | 210/793 |
| 4,197,201 | 4/1980 | Hjelmner et al. | 210/269 |
| 4,202,770 | 5/1980 | Gappa et al. | 210/268 |
| 4,246,102 | 1/1981 | Hjelmner et al. | 210/793 |
| 4,482,457 | 11/1984 | Jacquet | 210/271 |
| 4,707,252 | 11/1987 | Durot et al. | 210/188 |
| 4,720,347 | 1/1988 | Berne | 210/274 |
| 4,842,744 | 6/1989 | Schade | 210/676 |
| 4,861,472 | 8/1989 | Weis | 210/269 |
| 4,891,142 | 1/1990 | Hering, Jr. | 210/268 |
| 4,900,434 | 2/1990 | Schade | 210/268 |
| 5,019,278 | 5/1991 | Jacquet | 210/792 |
| 5,112,504 | 5/1992 | Johnson | 210/792 |
| 5,173,194 | 12/1992 | Hering, Jr. | 210/274 |
| 5,277,829 | 1/1994 | Ward | 210/792 |

FOREIGN PATENT DOCUMENTS

| | | |
|---|---|---|
| 2626868 | 8/1989 | France . |
| 539266 | 11/1931 | Germany . |
| 721643 | 6/1942 | Germany . |

Primary Examiner—Cynthia L. Nessler
Attorney, Agent, or Firm—Fish & Richardson

[57] ABSTRACT

A moving bed filter in which the liquid to be filtered is introduced into an internal chamber centrally disposed in the filter bed. The liquid flows through the filter bed to filtration nozzles which are disposed near the outer periphery of the filter bed. A portion of the filter bed media is continuously removed from a recessed chamber below the floor of the filter bed, transported by gas lift through a lift conduit to a washbox located above the filter bed, and cleaned by a countercurrent flow of the filtrate.

6 Claims, 3 Drawing Sheets

MOVING BED FILTERS

This is a continuation of application Ser. No. 08/145,254, filed Oct. 29, 1993, now abandoned.

BACKGROUND OF THE INVENTION

This invention relates to a method and apparatus for the filtration of a liquid.

Methods and apparatus for the filtration of liquids have many and varied applications, including without limitation the filtration of suspended and/or colloidal solids from waste water. Apparatus and methods have been developed which filter liquids by flow through a bed of particulate filter media (e.g., sand) in which the particulate filter media is continuously washed and recycled in the filter. See Hjelmner et al., U.S. Pat. Nos. 4,126,546 and 4,197,201.

In the filter apparatus shown in U.S. Pat. No. 4,060,484, the filter bed of sand has an inclined upper surface which has been created by the use of a baffle plate. The liquid to be filtered flows through the filter bed by entering the bed of sand through this inclined upper surface, passing through the filter bed, and exiting through a screen located near the exterior of the filter vessel. Sand from the filter bed is withdrawn from the bottom of the bed and raised above the top of the bed using air lift, causing the filter bed media to move in a downward motion toward the area from which the sand is being withdrawn. A portion of the liquid introduced to the filter is used as wash water to wash the sand which has been withdrawn from the bottom of the filter bed. The wash water, containing the contaminates removed from the washed sand, flows out of the filter apparatus.

It was recognized in U.S. Pat. No. 4,060,484 that particles of sand flowing downward over an inclined surface have a tendency to "classify" themselves according to size. It was stated in U.S. Pat. No. 4,060,484 that "Smaller particles tend to remain at the top of the slope while larger particles roll down the slope." This gives a structured effect to the filter bed shown in U.S. Pat. No. 4,060,484, in which coarser particles of sand would migrate toward the inlet side of the filter bed, and finer particles of sand would migrate inwardly therefrom. The water outlet side of the filter bed had particles of full size range because sand entering the filter vessel adjacent the exterior of the filter vessel would flow vertically downward without segregation.

In Hering, U.S. Pat. No. 4,891,142, an attempt was made to increase the efficiency and effectiveness of the filter shown in U.S. Pat. No. 4,060,484. In the filter shown in U.S. Pat. No. 4,891,142, as in the filter shown in U.S. Pat. No. 4,060,484, the filter bed media is withdrawn from the base of the filter bed, washed, and resupplied to the top of the filter bed. However, in the filter shown in U.S. Pat. No. 4,891,142, the filter media forms a peak shape which descends downwardly and radially outward from the center of the filter. The liquid to be filtered passes through the peak shape and is filtered downwardly through the filter bed. The peak shape forms an inclined surface which also "classifies" the filter bed media by size, the coarser particles of filter bed media tending to roll down the slope of the peak while the finer particles tend to flow vertically downward through the peak and the filter bed. The liquid to be filtered flows first through the outer layer of coarser filter media and then through the layer of finer filter media, exiting through a screened filtrate enclosure which is located toward the bottom of the filter bed in the center.

In Hering, U.S. Pat. No. 5,173,194, it was stated that downflow filters having a screen or other filter media retaining device, such as are shown in U.S. Pat. Nos. 4,060,484 and 4,891,142, are subject to clogging and blockage, requiring periodic removal of the filter bed media to permit cleaning or replacement of the screen or other filter media retaining device. The filter shown in U.S. Pat. No. 5,173,194 includes a centrally located liquid collection chamber having a liquid-impervious top or hood attached to liquid-impervious sidewalls with an open bottom. While this overall design is that of a downflow filter, the open bottom and liquid-impervious top and sidewalls of the liquid collection chamber obviate the need for a screen or other porous filter media retention device.

One aspect of this invention is to provide a self regenerating particulate filter in which the contaminated filter media is cleaned by a countercurrent flow of filtrate from the filter.

Another aspect of this invention is to provide a moving bed filter which eliminates the "dead zone" of filter media in the filter bed and has a substantially reduced volume of filter media located below the gas lift conduit.

Yet another aspect of this is invention to provide a moving bed filter in which the regeneration zone for the filter media is separated from both the inlet to and the outlet from the filter by the filter bed.

Other aspects and advantages of the invention will become apparent from the drawings and description which follow.

SUMMARY OF THE INVENTION

In the present invention, the liquid to be filtered enters the filter bed through an internal chamber, the bottom of which opens into the filter bed below the upper surface of the filter bed. The liquid to be filtered flows from the internal chamber through the filter bed to filtration nozzles located around the outer periphery of the filter bed. A portion of the filtrate exits through the top of the filter bed, and is used to wash the dirty filter media which is removed from the region near the bottom of the filter bed. To eliminate the "dead zone" of filter media in the filter bed which is not effectively washed, a recessed chamber or sump is provided which is located below the floor of the filter bed.

DESCRIPTION OF THE PREFERRED EMBODIMENTS

Figure 1:
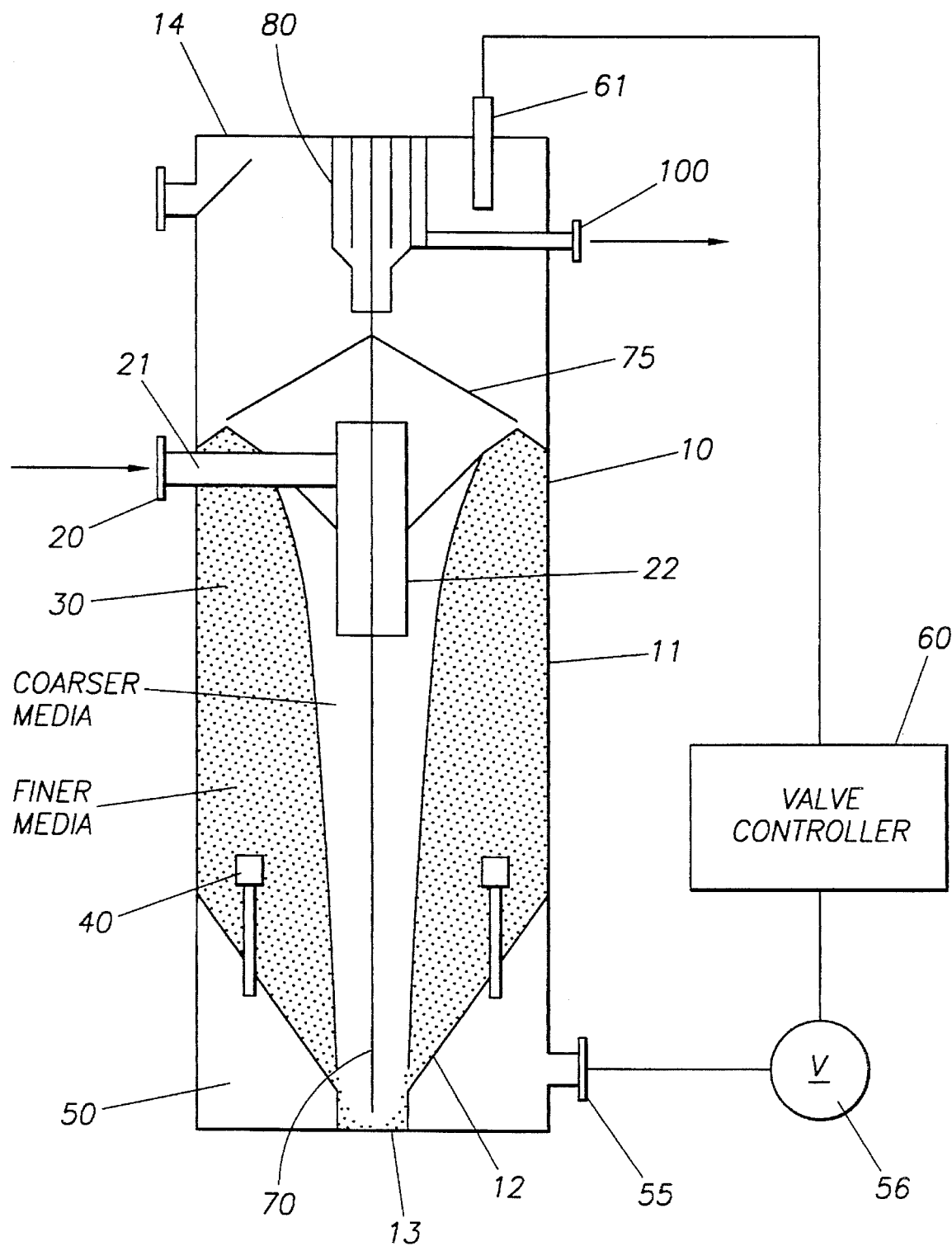
FIG. 1 is a schematic representation of the invention.

In the following description, and in the accompanying drawings, the same reference numerals are used to refer to like features or elements among the various drawings and embodiments.

The schematic representation of the preferred embodiment shown in FIG. 1 comprises a vessel 10 having sidewalls 11, a frustro-conical floor 12 which is connected at its center to a recessed chamber or sump 13, and a top 14. The vessel may be made of any suitable material or combinations of materials, including without limitation fiberglass reinforced plastic, carbon steel, or stainless steel. The shape of the sidewalls of the vessel preferable is cylindrical to minimize the effect os corners, which might become "dead zones" in the filter bed.

The liquid to be filtered, containing suspended solid and/or colloidal contaminants, enters the filter through inlet port 20, which is connected by fluid passageway 21 to internal chamber 22. Internal chamber 22 has a liquid-impervious top and sidewalls, and is open at the bottom. The bottom of internal chamber 22 opens into the filter bed below the level of the top of the filter bed. The liquid to be filtered passes through the filter bed 30, filtrate nozzles 40 located near the outer periphery of the filter bed 30, and into a well or manifold 50. The filtered liquid, which is now substantially free of suspended solid and/or colloidal contaminants, exits the vessel through outlet port 55, the flow through which is controlled by valve 56. Valve 56 is in turn controlled through suitable electronic or electromechanical control means 60 by level sensor 61, which may be an ultrasonic level sensor.

A gas supply line (not shown) supplies a gas such as air from a source of gas (not shown) to the interior of a lift conduit 70. Preferably, the gas supply line is placed beside and parallel with the lift conduit 70, and both may be surrounded by a protective sleeve or sheath to protect the exterior surfaces of both from abrasion by the moving filter bed and/or other damage. The gas supply line may be tapped into or otherwise penetrate the wall of the lift conduit at a point near the lower end of the lift conduit to inject gas into the interior of the lift conduit at that point. Gas is injected into the lift conduit 70 preferably at about 3–12 inches, and more preferably at about 6 inches, from the lower end of the lift conduit. The bottom end of the lift conduit typically may be placed about 1½ inches from the bottom of the recessed chamber 13. The gas entering the lift conduit 70 causes an upward flow of the liquid and filter media located in the lower end of the lift conduit 70.

The resulting flow of the mixture of gas, liquid, and dirty filter media through the lift conduit carries dirty filter media through the center of baffle 75 and into the interior of the washbox 80. The turbulent flow of the gas, liquid, and filter media in the lift conduit 70 provides a scrubbing action which preferably substantially separates the contaminants from the filter media before the flow is discharged into the washbox 80.

Filter bed media is thus removed from the recessed chamber or sump 13, which in turn is refilled continuously by gravity flow from the filter bed located above it. The use of the recessed chamber 13 eliminates the "dead zone" which otherwise would be present in the lower portion of the filter bed, and substantially reduces the volume of filter bed media which is not accessible to the gas lift pumping action, particularly in large diameter filters.

The washbox 80 is a baffled chamber that provides for the counter-current washing of the filter media and separation of the cleaned filter media from the concentrated contaminants, as discussed in more detail below.

The contaminants washed from the filter media exit the vessel through reject outlet 100, from which the waste contaminants may be piped to either a suitable disposal point or location for subsequent treatment or collection.

The regenerated filter media is returned by gravity through annular passageway 81 through the bottom of the washbox 80. The regenerated filter media contacts the upper surface of baffle 75, which directs the flow of the regenerated filter media toward the sidewalls 11 of the vessel 10.

The filter bed media will classify itself by particle size, developing a particle size gradation through the filter bed. After passing over the baffle 75, the coarser particles will tend to roll toward the center of the filter vessel, while the finer particles will tend to remain at or near the outer periphery of the filter bed. This creates a highly desired distribution of coarser filter media toward the center of the filter bed, where the contaminated liquid first enters the filter bed, and finer filter media toward the outer periphery of the filter bed, where the filtration nozzles 40 are located.

The preferred filter media is sand, preferably a high quality multigrade silica sand. Tests were made using a silica sand having the following particle size distribution:

| Particle Size (Mesh) | % by Weight |
|---|---|
| 8–12 | 13⅓ |
| 12–20 | 53⅓ |
| 16–30 | 33⅓ |

Depending on the application, a finer grade of filter media may be desired to obtain better filter performance; however, finer filter media generally will increase the pressure drop across the filter bed.

Figure 3:
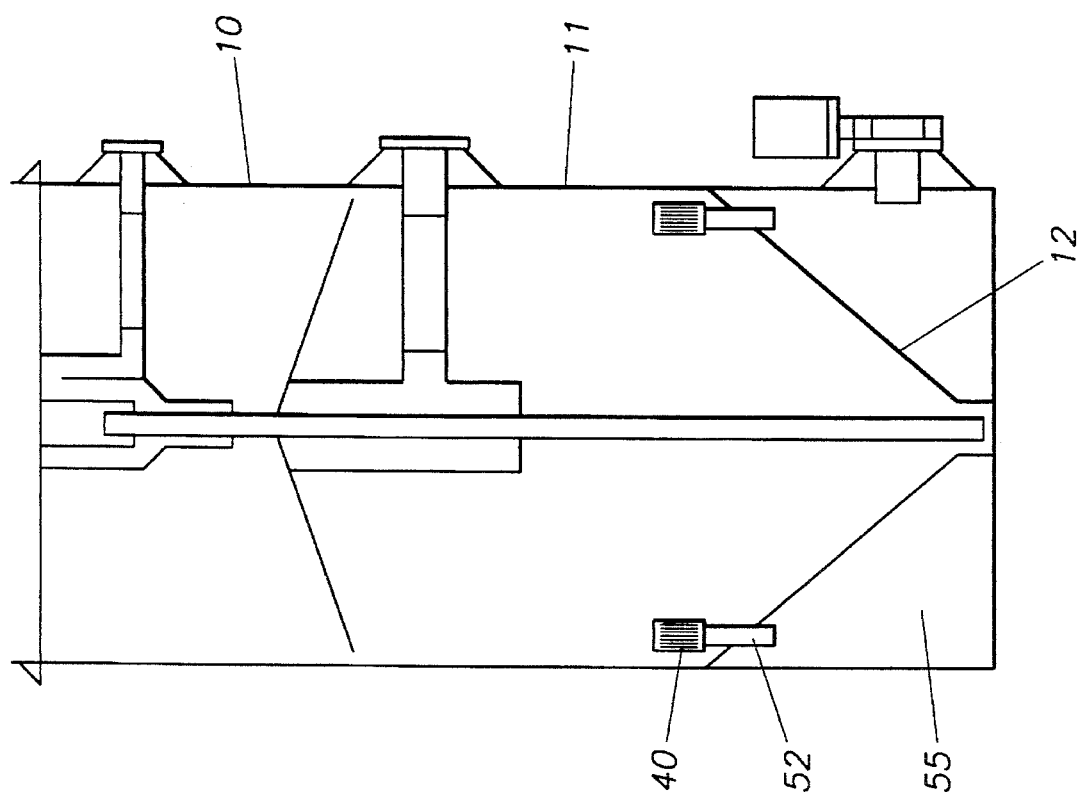
FIG. 3 is a cross section of another embodiment of the invention.
Figure 2:
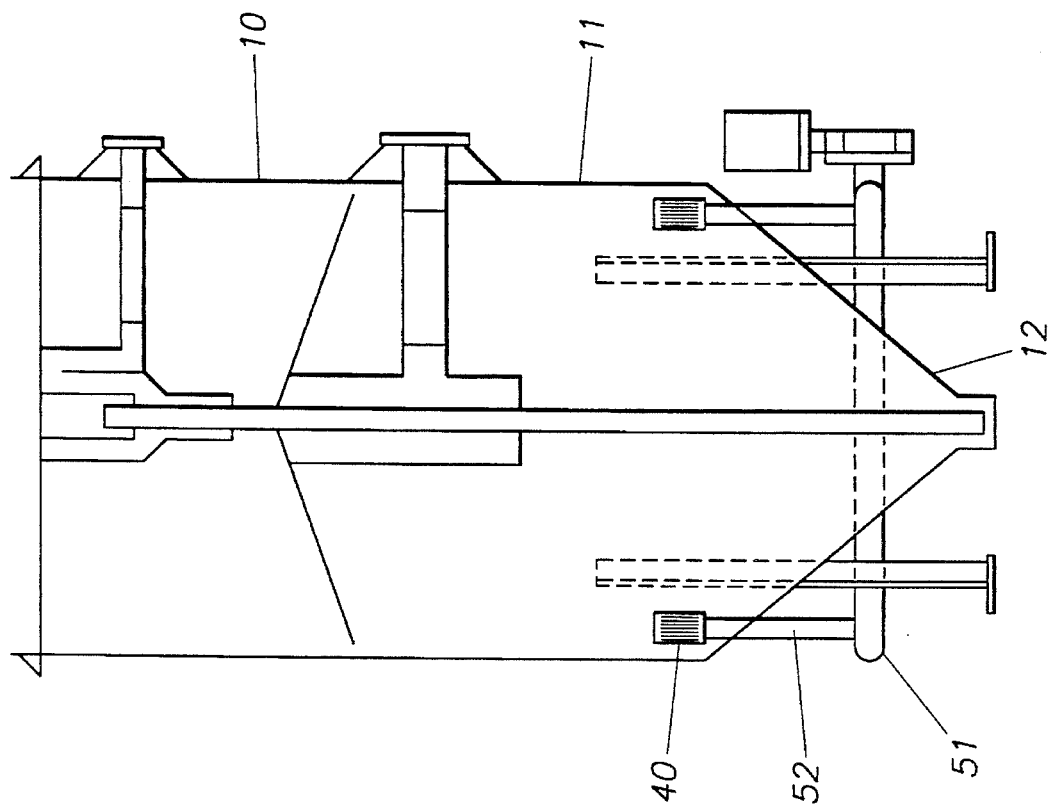
FIG. 2 is a cross section of one embodiment of the invention.

In the preferred embodiment shown in FIG. 2, the filtered liquid passes through the filtrate nozzles 40, and into outlet manifold 57 through conduits 52 connecting the filtrate nozzles with the manifold. In the preferred embodiment shown in FIG. 3, the design of the outlet manifold has been modified. In FIG. 3, the function of the outlet manifold is performed by the well 55 located between the lower portion of the sidewalls 11 of the vessel 10 and the generally conical bed floor 12.

Filter media and accumulated contaminants preferable are removed continuously from the recessed chamber 13 located below the filter bed by a gas lift pump action as described above and transported to the washbox 80 for cleaning and separation. A gas, such as compressed air, is introduced into the lift conduit 70 at a rate on the order of 2–5 scfm at 30 psi. This creates a mixture of gas, liquid, and dirty filter media which has a relatively low density, causing the mixture to rise to the top of the lift conduit 70, where it is discharged into the washbox 80. Through selection of the size of the lift conduit and the rate of gas flow, the contaminated filter media is transported with sufficient turbulence to scour the waste materials from the filter media. For most applications, a rate of gas delivery is used which will provide a filter bed turnover rate of once every four hours. Depending on the requirements of the particular application, greater filter bed turnover rates may be achieved. The gas delivery rate can be adjusted easily based on specific site conditions.

Figure 4:
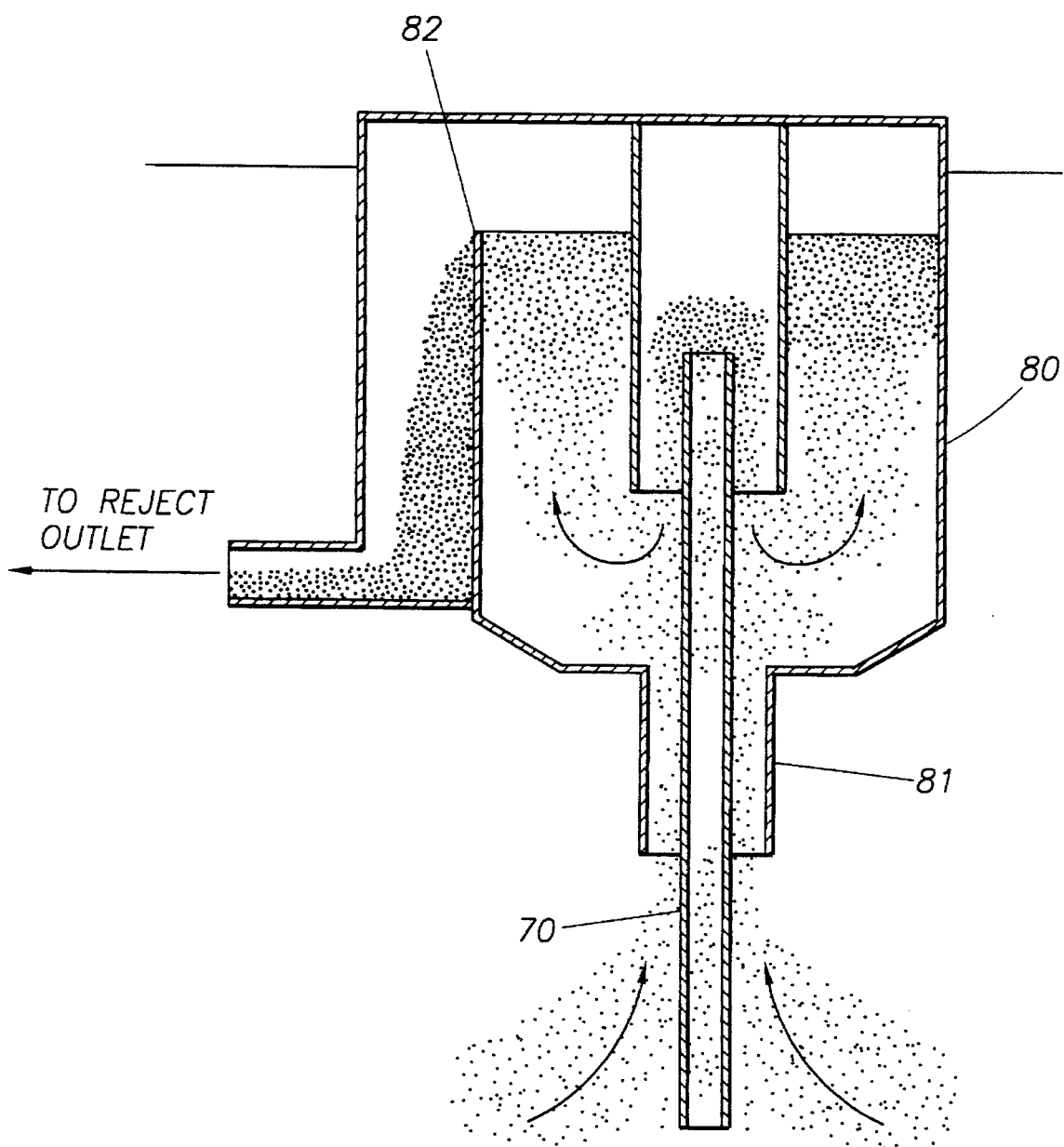
FIG. 4 is a cross section of an embodiment of the washbox used in the invention.

The washbox is shown in greater detail in FIG. 4. The gas lift pump discharges into the interior of the washbox 80. A relatively small amount of filtrate from the filter bed enters into the washbox 80 through the annular passageway 81, creating a countercurrent flow with the filter media which is exiting downward through the same annular passageway by gravity. The waste materials, which have a relatively lower density than the filter media, are maintained in suspension in the washbox 80. The filtrate entering the washbox exits over the weir 82 and out the reject outlet 100, carrying with it a concentrated amount of the waste materials which were in suspension in the washbox. The dimensions of the washbox 80 may vary depending upon the anticipated rate of flow of liquid through the filter, the size and density of the filter media expected to be used, and other such variables. However, the washbox should be configured to permit liquid to enter through the annular passageway 81 at a rate which will permit the filter media to move downward by gravity through the same passageway, while maintaining a high proportion of the waste materials in the washbox in suspension. For most applications, the volume of the flow out the reject outlet 100 will be approximately 2%–9% of the total flow through the filter.

Each filter preferably is equipped with multiple filter nozzles located in a spaced relation in the lower region of the filter bed near its outer periphery. These filter nozzles act as a barrier between the filtrate exiting the filter and the moving filter bed. The nozzles may be constructed of various materials and combinations of materials to suit the particular application, including without limitation Kynar, polypropylene, and stainless steel. The preferred embodiment uses bars or wires having a trapezoidal cross-section to form slotted openings in the nozzles, the wider bases of the trapezoids facing the filter bed. The slotted openings between the bars or wires are designed to have a width on the order of 0.004–0.020 inches, depending on the size of the filter media and the particular filter application. The slotted openings typically are oriented vertically. The width of the openings in the nozzles preferably are designed to be no greater than approximately one-half of the diameter of the finest filter media particles. The trapezoidal cross sectional shape of the bars or wires prevents the particles of filter media from becoming lodged in the slots between adjacent bars or wires.

Multiple filter modules of the type described above may be connected in parallel to operate simultaneously to provide an overall filter unit having a substantially greater capacity than each of the individual filter modules. This also permits the filter unit to remain in operation, although at perhaps a reduced capacity, if one or more of the individual filter modules is not in operation for any reason.

The foregoing description is intended to be illustrative of the preferred embodiments, it being understood that the concepts of the invention may be practiced in other ways as well. While these embodiments represent what are regarded as the best modes for practicing the invention which are known at this time, they are not intended to limit the scope of the invention, which is set forth in the following claims.

What is claimed is:

1. A moving bed filter apparatus comprising:
   (a) a vessel;
   (b) a filter bed of particulate filter media within said vessel, said filter bed having an upper surface;
   (c) an inlet port;
   (d) an outlet port;
   (e) an internal chamber in fluid communication with said inlet port, said internal chamber having a liquid impervious top and sides and an open bottom, said bottom being located below the upper surface of said filter bed;
   (f) at least one filtrate discharge nozzle which is located near the outer periphery of said filter bed and substantially below the upper surface of said filter bed and is in fluid communication with said outlet port;
   (g) a washbox, located within such vessel above said upper surface of the filter bed and separated from the outlet port by the filter bed, for regenerating the filter media using a countercurrent flow of filtrate liquid; and
   (h) a lift conduit located within said vessel for transferring filter media, said lift conduit fluidly communicating the bottom of said filter bed with said washbox.

2. The filter of claim 1 in which the lift conduit extends into a recessed chamber which is located below and is in communication with the filter bed.

3. A self regenerating particulate bed filter comprising:
   (a) a particulate filter bed, said filter bed having an upper and a lower surface;
   (b) a housing for containing said filter bed;
   (c) a feed chamber which opens into said filter bed at a location below the upper surface of said filter bed;
   (d) a plurality of discharge nozzles which are located near the outer periphery of said filter bed and substantially below the upper surface of said filter bed;
   (e) a washbox located within said housing above the upper surface of said filter bed; and
   (f) a lift conduit located within said housing for transporting filter bed media, said lift conduit fluidly communicating the lower surface of said filter bed with said washbox.

4. The filter of claim 3 in which the lower end of the lift conduit extends into a recessed chamber which is located below and is in communication with the filter bed.

5. A method of filtering a liquid containing suspended solid or colloidal contaminants comprising the steps of:
   (a) introducing the liquid to be filtered into a particulate filter bed contained within a housing at a point which is below the upper surface of said filter bed and substantially above the bottom of said filter bed;
   (b) flowing the liquid through said filter bed to a discharge nozzle located near the outer periphery of said filter bed and substantially below the upper surface of said filter bed;
   (c) continuously transporting a portion of the filter bed media containing entrapped contaminants from the filter bed through a lift conduit located within said housing to a washbox located above the upper surface of said filter bed and within said housing for regenerating said filter media by removing at least a portion of said contaminants from the filter bed media; and
   (d) returning the regenerated filter bed media to the filter bed.

6. The method of claim 5 in which the contaminated filter bed media is regenerated by being subjected to a countercurrent flow of filtrate liquid from the filter bed.

* * * * *